United States Patent [19]

Kim

[11] Patent Number: 5,666,451

[45] Date of Patent: Sep. 9, 1997

[54] VIDEO COMPACT DISC HAVING CAPTION DATA RECORDED THEREON AND REPRODUCING METHOD AND APPARATUS THEREOF

[75] Inventor: Jun-Sik Kim, Seoul, Rep. of Korea

[73] Assignee: Daewoo Electronics Co., Ltd., Seoul, Rep. of Korea

[21] Appl. No.: 580,940

[22] Filed: Dec. 29, 1995

[30] Foreign Application Priority Data

Dec. 30, 1994 [KR] Rep. of Korea .................. 94-39388

[51] Int. Cl.[6] ..................... H04N 5/928; H04N 5/781; H04N 7/26
[52] U.S. Cl. ................. 386/97; 386/105; 386/106; 386/111; 386/126
[58] Field of Search ......................... 358/335, 342, 358/322, 341; 360/18, 33.1; 348/468; 386/33, 45, 95–98, 104–106, 109, 111–112, 125, 126

[56] References Cited

U.S. PATENT DOCUMENTS

| | | | |
|---|---|---|---|
| 4,992,886 | 2/1991 | Klappert | 358/342 |
| 5,055,939 | 10/1991 | Karamon et al. | 358/341 |
| 5,130,816 | 7/1992 | Yoshio | 358/341 |
| 5,280,572 | 1/1994 | Case et al. | 395/144 |
| 5,289,288 | 2/1994 | Silverman et al. | 358/335 |
| 5,493,677 | 2/1996 | Balogh et al. | 395/600 |
| 5,497,241 | 3/1996 | Ostrover et al. | 358/341 |

*Primary Examiner*—Andrew Faile
*Assistant Examiner*—Vincent F. Boccio
*Attorney, Agent, or Firm*—Beveridge, DeGrandi, Weilacher & Young LLP

[57] ABSTRACT

A video compact disc having caption data recorded thereon and a method and an apparatus thereof selectively displays a plurality of caption data prepared in different languages during playback operation of either a video-song or a movie having a full motion picture. The plurality of caption data prepared with the different languages with respect to the same picture signal is recorded on a control data area included in the video compact disc, which is reproduced selectively in either on or off basis to display character information expressed via a language selected among the various languages us a user, and increasing the user's pleasure and providing a video-song program and a movie program of high-functionality and high quality.

7 Claims, 4 Drawing Sheets

| | R | S | T | U | V | W |
|---|---|---|---|---|---|---|
| 0 | MODE | | | ITEM | | |
| 1 | INSTRUCTION | | | | | |
| 2 | PARITY Q1 | | | | | |
| 3 | PARITY Q2 | | | | | |
| 4 | CH0 | | COLOR 0 | | | |
| 5 | CH1 | | COLOR 1 | | | |
| 6 | 0 | ROW | | | | |
| 7 | COLUMN | | | | | |
| 8 . . . 19 | FONT (6BIT × 12ROW) | | | | | |
| 20 | PARITY P0 | | | | | |
| 21 | PARITY P1 | | | | | |
| 22 | PARITY P2 | | | | | |
| 23 | PARITY P3 | | | | | |

VIDEO COMPACT DISC HAVING CAPTION DATA RECORDED THEREON AND REPRODUCING METHOD AND APPARATUS THEREOF

BACKGROUND OF THE INVENTION

1. Field of The Invention

The present invention relates to a video compact disc having caption data recorded thereon and reproducing method and apparatus thereof, and more particularly to a compact disc having caption data recorded on a control data area thereof (i.e., compact disc graphics data area) and to a reproducing method and an apparatus for performing a selective playback or on/off driving of the caption data recorded on the video compact disc.

2. Description of the Prior Art

As is generally known, a compact disc graphics (hereinafter referred to as "CDG" for short) disc having graphics data recorded thereon has been developed from a compact disc (hereinafter referred to as "CD"), which is well known as an information recording medium on which a large quantity of audio signals of high fidelity is recorded, and has been put to practical use. Generally, the CDG disc includes a subcode consisting of a P channel for displaying whether or not an audio signal is recorded, a Q channel assigned to the audio signal, and R channel-W channel allotted for recording the graphics data, so that a graphic video signal related to the audio signal is reproduced during the playback operation of the audio signal.

Recently, a so-called video compact disc (hereinafter referred to as "VCD"), on which full motion video information is, recorded, has been put to practical use. In the VCD, a full motion picture and an audio signal are recorded in a data compression system by means of a moving picture experts group (hereinafter referred to as "MPEG" for short) algorithm, and the compressed data is decoded to reproduce the original video signal and audio signal. Therefore, since the data of a full motion picture can be recorded on/reproduced from the VCD, a karaoke music program (hereinafter referred to as "video-song program") or a movie program can be recorded thereon. The VCD includes a user data (video program data) area, an error correction code recording area and a control data area having a subcode recorded thereon, which has the same pattern as the CDG disc. By this area configuration, when recording a video-song program or a movie program, word data of a video-song or caption data such as the lines of the movie can be recorded on the CDG. However, despite assigning the control data recording area having the same data structure as that of the CDG disc, when program data (i.e., video data) is recorded on the VCD, instead of using the control data recording area, the word data of a video-song or the caption data of a movie program are generally recorded on the user data area in the state where the data compression processing of the word data of a video-song or the caption data of a movie program has performed together with the program data by means of the MPEG algorithm.

One example of a method and apparatus for recording and reproducing picture information and recording medium is disclosed as follows in U.S. Pat. No. 5,282,186, issued to Yoshio et al. Here, in addition to a coded information signal, subcodes, together with identification codes for identifying the coding system of the subcodes, are recorded in a first recording area of a recording medium, and the identification codes and content discrimination codes, for indicating contents of information included in the subcode using the coding system indicated by the identification code, are recorded in a second recording area of the recording medium. It is further characterized in that the identification code and the content discrimination information recorded in the second recording area are displayed at the time of playback of the recording medium.

One example of a method and apparatus for storing MIDI (musical instrument digital interface) information in subcode packs is disclosed as follows in U.S. Pat. No. 4,942,551. The apparatus and method encodes data in a MIDI format on an audio compact disc, without affecting the digitized sound stored in the main channel by utilizing what is known as the subcode channel of the compact disc, which is reserved for information other than digitized compact disc audio data. The patent is directed to a technique for converting the MIDI information generated by a MIDI source (for example, a keyboard or a sequencer) into subcode data, which may be recorded on a transportable floppy diskettes or other transportable media for subsequent conversion to signals which are inputted to a compact disc encoder which places the MIDI information into the subcode channel.

In the VCD of the above structure and the reproducing apparatus thereof having the caption data, which is recorded thereon, because the word data of the video-song information or the caption data of the movie program recorded on the VCD are recorded in the state where either the word data of the video-song information or the caption data of the movie program are superimposed on the original video signal, only word data or caption data of a single kind can be recorded. Furthermore, since either the word data or the caption data is recorded together with the video program information in a mixed structure, it is difficult to perform selective on/off playback operation of either the word data or the caption dam.

SUMMARY OF THE INVENTION

Therefore, it is a first object of the present invention to provide a VCD having a caption function for selectively reproducing caption data or word data by recording a plurality of caption data prepared in different languages with respect to the same picture signal on a CDG data area in a VCD in which both a user data area having a video signal and an audio signal of a full motion picture recorded thereon, and a CDG data area are assigned.

It is a second object of the present invention to provide a method for selectively reproducing either the caption data or the word data from the VCD, and for enabling the playback operation of either the caption data or the word data in either the on or off form.

It is a third object of the present invention to provide a reproducing apparatus suitable for performing the method for reproducing the VCD having the caption data recorded thereon.

In order to achieve the above first object, the present invention provides a video compact disc having caption data recorded thereon, which comprises:

a lead-in area having disc management information recorded thereon;

a program area having full motion picture video/audio information recorded thereon, and including a first area having a synchronizing signal, header data and MPEG-processed audio/video data respectively recorded thereon, a second area having error correction code data recorded thereon and a third area having CDG data recorded thereon; and a lead-out area for indicating the final section of the program area, whereby a plurality of caption data prepared in different languages with respect to the same picture signal is recorded on a subcode channel included in the third area so as to selectively reproduce the caption data.

In order to achieve the above second object, the present invention provides a method for reproducing a video compact disc having caption data recorded thereon, which comprises the steps of:

(i) judging whether or not the caption data is included in a third area of a program area in the video compact disc when graphics data exists in the video compact disc;

(ii) performing a normal playback processing operation of full motion picture video and audio signals when it is determined in step (i) that the caption data is not included in the video compact disc;

(iii) inputting a selection control signal for selecting a kind of the caption data when it is determined in step (i) that the caption data is included in the video compact disc;

(iv) performing a playback processing operation of the caption data;

(v) judging whether or not a control signal for a screen display of the caption data is received;

(vi) displaying the full motion picture video signal on a screen of a display section when it is determined in step (v) that the control signal for the screen display of the caption data is not received;

(vii) performing an input operation for designating the caption data of a desired channel when it is determined in step (v) that the control signal for the screen display of the caption data is received;

(viii) mixing a reproduced video signal with the caption data of the channel selected in step (vii), and superimposing the caption data on the full motion picture video signal; and (ix) displaying the full motion picture video signal including the caption data constituted in step (viii), on the screen of the display section.

In order to achieve the above third object, the present invention provides an apparatus for reproducing a video compact disc having caption data recorded thereon, which comprises:

a control section for controlling a caption function set by a control panel section or controlling a normal playback process of the video compact disc when inputting a control signal with respect to the caption function set from the control panel section, a channel selection signal for selecting a language to be displayed on a screen by the caption function and a control signal for driving the caption function in the system of on/off, and for providing a first and second control signals;

a servo circuit section for providing a first, second and third servo circuit signals in order to rotatably drive the video compact disc, and to search and control a target position for reproducing information from the video compact disc in response to the first control signal from the control section;

audio/video readout means for providing an audio/video readout signal by means of a laser beam to read out audio and video signals from the video compact disc which includes a lead-in area having disc management information recorded thereon and a program area having full motion picture video/audio information recorded thereon, the program area including a first area having a synchronizing signal, header data, and MPEG-processed audio/video data respectively recorded thereon, a second area having error correction code data recorded thereon, and a third area having CDG data recorded thereon and caption data prepared in different languages with respect to an identical picture data recorded on a subcode channel thereof, and a lead-out area for indicating the final section of the program area;

an RF amplifying section for amplifying the audio/video readout signal supplied from the audio/video readout means, and for providing an amplified RF signal;

a CD digital signal processing section for digital-signal-processing the amplified RF signal supplied from the RF amplifying section, and for providing a first and second digital-processed CD signals;

a CD-ROM decoding section for extracting CD-ROM XA data from the first digital-processed CD signal in order to reproduce an MPEG audio/video signal, which is processed by means of the MPEG algorithm from the first digital-processed CD signal supplied from the CD digital signal processing section, and for providing a decoded CD-ROM signal;

an MPEG audio/video decoding section for restore-processing the decoded CD-ROM signal supplied from the CD-ROM decoding section, and for providing a first decoded video signal and a second decoded audio signal, which respectively correspond to the MPEG video and audio signals;

a CDG decoding section for decoding the second digital-processed CD signal supplied from the CD digital signal processing section in response to the second control signal supplied from the control section, and for reproducing to output a decoded CDG signal corresponding to the CDG data recorded on the third area included in the video compact disc;

a superimposing processing section for superimposing the decoded CDG signal corresponding to the caption data supplied from the CDG decoding section on the first decoded video signal, which corresponds to the reproduced video signal supplied from the MPEG audio/video decoding section, and for providing a superimposing-processed video signal in which the caption data is superimposed onto;

a display control section for inputting the superimposing-processed video signal supplied from the superimposing processing section, and for providing a display control signal; and a display section for inputting the display control signal supplied from the display control section and displaying the video signal in which the caption data is superimposed onto.

In a VCD having the caption data recorded thereon and in a reproducing method and an apparatus thereof, a plurality of caption data prepared in different languages with respect to the identical picture signal is recorded on a control data area included in the VCD, so that the caption data is selectively reproduced or reproduced, whether the system is on or off. As a consequence, the character information is displayed by means of the language selected among the plurality of languages by the user while either the video-song information or the movie program including the full motion picture is reproduced, and thereby increasing the user's interest in the program.

BRIEF DESCRIPTION OF THE DRAWINGS

The above objects and other advantages of the present invention will become more apparent by describing in detail preferred embodiment thereof with reference to the attached drawings, in which:

FIG. 2 is a view for showing the CDG data format recorded on the control data area of the VCD shown in FIG. 1;

DESCRIPTION OF THE PREFERRED EMBODIMENT

A description will be given below in detail to a VCD having caption data recorded thereon, the circuit configuration, and the operations of a reproducing method and an apparatus thereof according to an embodiment of the present invention with reference to accompanying drawings.

The date and the specific version of the MPEC standard are respectively 1993(E) and MPEGl ISO/IEC 11172-1, -2 and -3.

Figure 1:
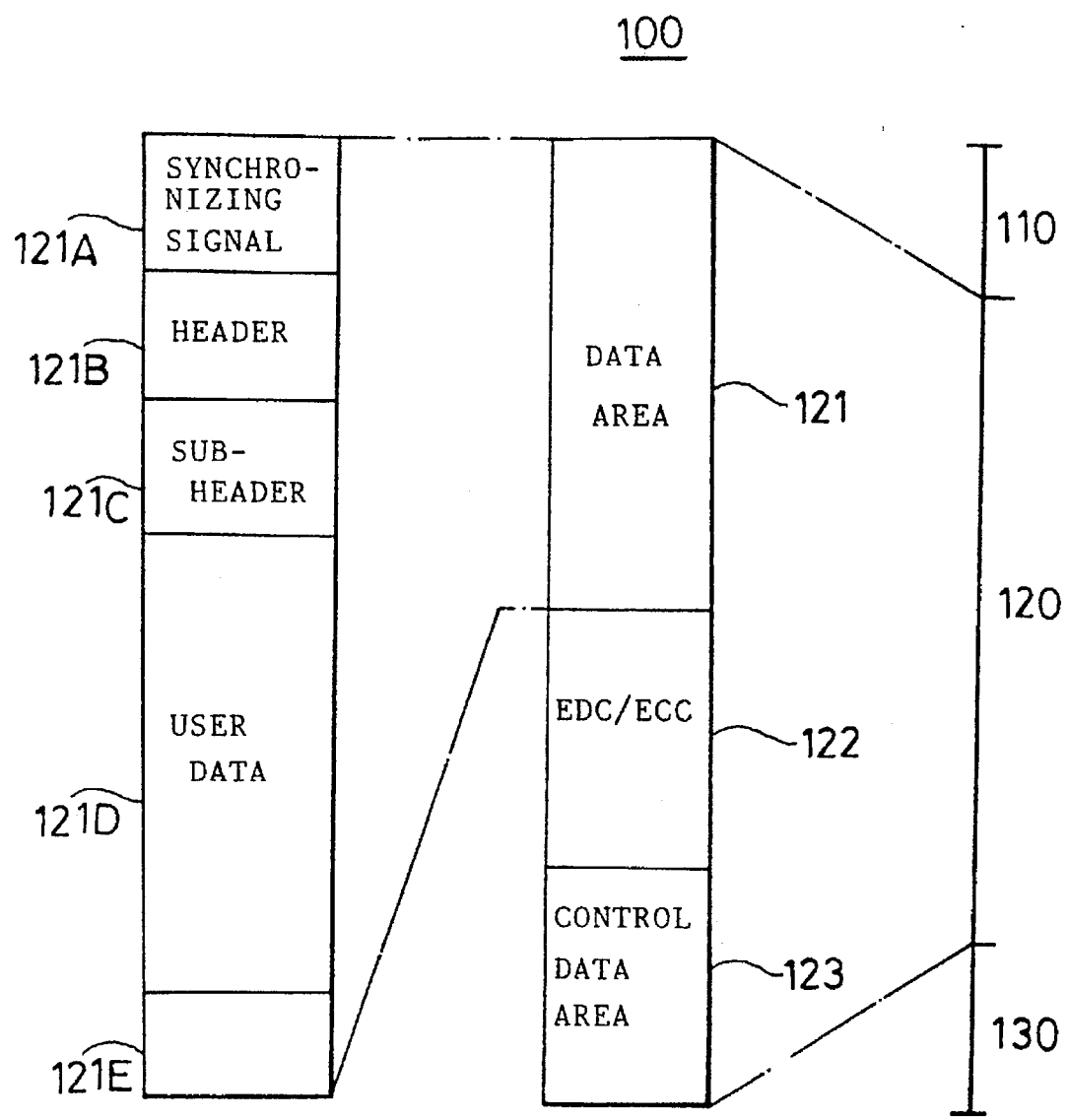
FIG. 1 is a view for illustrating the data format of a VCD applied to one embodiment of the present invention.

FIG. 1 is a view for illustrating a data format of a VCD applied to one embodiment of the present invention. As shown in FIG. 1, a VCD 100 generally includes a lead-in area 110 having management information of VCD 100 recorded thereon, a program area 120 having MPEG video/audio information recorded thereon which is processed by the MPEG system and a lead-out area 130 for indicating a final section of the information recording on VCD 100. Program area 120 includes a data area 121, which is allotted with 2352 bytes, first and second error correction data areas 122, which are respectively allotted with 392 bytes, and a control data area 123, which is allotted with 98 bytes. Data area 121 includes a synchronizing signal 121A, which is allotted with 12 bytes, a header 121B and a subheader area 121C, which are respectively allotted with four bytes and eight bytes, a user data area 121D, which is allotted with 2324 bytes, and an unused area 121E, which is allotted with four bytes. On user data area 121D, the MPEG video/audio data processed by the MPEG algorithm are recorded.

FIG. 2 is a view for showing a CDG data format recorded on the control data area of the VCD shown in FIG. 1. As shown in FIG. 2, in the control data, 96 bytes, which remains when the synchronizing signal is excepted from the 98 bytes, are divided into four packs. One of the four packs has a data record field of the format shown in FIG. 2, in order to record the CDG data. The data record field in FIG. 2 consists of a mode and an item for designating a control mode of the relevant pack, an instruction for recording an instruction word, parities Q1 and Q2 for error detection, channels 0 and 1 for setting the channel of the relevant pack, a row and a column for designating the position of the font prepared with the pack, and font data (6bits×2 rows) for designating the font of the caption data.

Therefore, in order to enable the designation, which is classified by the language, such as Korean, English or Japanese by combining the channels 0 and 1 in the data record field, a plurality of packs which have the caption data recorded therein and are prepared in a plurality of languages such as Korean, English or Japanese with respect to the video signal of the identical full motion picture, is established. Also, a screen display position of the font data recorded in the data record field is designated by the column and the row. In case that the font data such as Korean, English, or Japanese, which are designated by the channels, is recorded, the caption data (i.e., caption data with respect to either the video-song information or the movie program), which is prepared with a language selected from the plurality of languages by the selection of the channels is displayed on a display apparatus.

Figure 3:
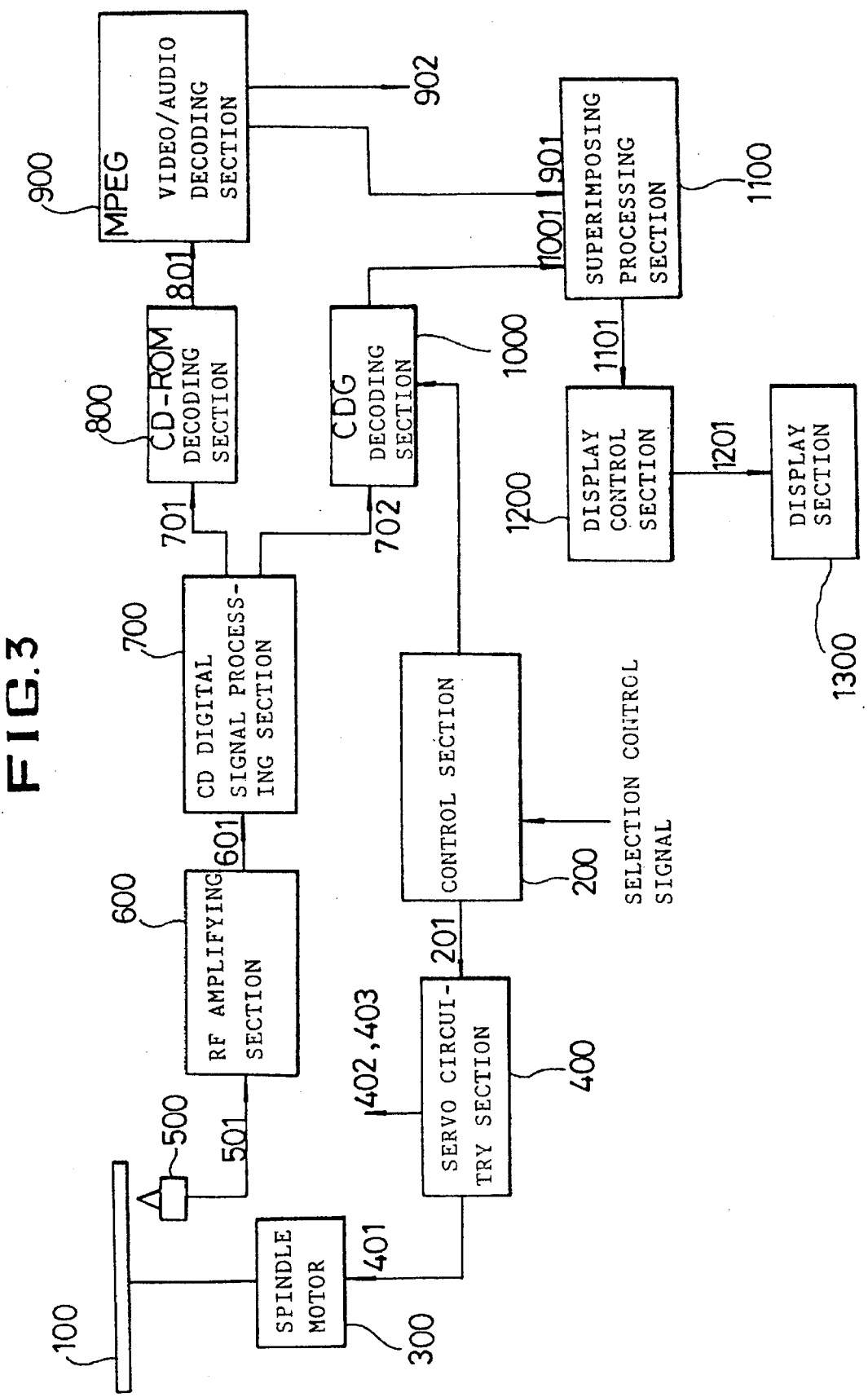
FIG. 3 is a circuit block diagram for showing the circuit configuration of the reproducing apparatus for the VCD having caption data as shown in FIGS. 1 and 2.

FIG. 3 is a circuit block diagram for showing a circuit configuration of a reproducing apparatus for the VCD having caption data as shown in FIGS. 1 and 2. As shown in FIG. 3, the reproducing apparatus for the VCD having caption data recorded thereon includes a control section 200. When a control signal for a caption function which is set by a control panel section (not shown), both a channel selection signal, for selecting the language which will be displayed on a screen by the caption function, and a control signal, for turning the caption function on or off are inputted, control section 200 controls the caption function which has been set by the control panel section or controls the normal playback processing of VCD 100, and provides first and second control signals 201 and 202.

In response to first control signal 201 supplied from control section 200, a servo circuit section 400 outputs first, second, and third servo circuit signals 401, 402, and 403 in order to perform both servo control operation of a spindle motor 300 which rotates VCD 100 at a predetermined speed, and search and control operation of a target position for reproducing the information from VCD 100. First, second, and third servo circuit signals 401, 402, and 403 are respectively a spindle motor control driving signal, a focusing control operation driving signal, and a tracking control operation driving signal.

An audio/video readout section 500 corresponds to an optical pickup apparatus which reads out RF information recorded on VCD 100 in response to second and third servo circuit signals 402 and 403 which are supplied from servo circuit section 400, and provides an audio/video readout signal 501 by reading out audio and video signals from VCD 100 by means of a laser beam.

An RF amplifying section 600 amplifies audio/video readout signal 501 supplied from audio/video readout section 500, and provides an amplified RF signal 601.

A CD digital signal processing section 700 digital-signal-processes amplified RF signal 601 supplied from RF amplifying section 600, and provides first and second digital-processed CD signals 701 and 702.

A CD-ROM decoding section 800 extracts a CD-ROM XA (CD-ROM extended architecture) data from first digital-processed CD signal 701 so as to reproduce the MPEG video/audio signal processed by the MPEG algorithm from first digital-processed CD signal 701, which is supplied by CD digital signal processing section 700, and provides a decoded CD-ROM signal 801.

A MPEG video/audio decoding section 900 restore-processes decoded CD-ROM signal 801 supplied from CD-ROM decoding section 800, and provides a first decoded video signal 901 and a second decoded audio signal 902, which respectively correspond to the MPEG video and audio signals.

A CDG decoding section 1000 decodes second digital-processed CD signal 702, which is supplied from CD digital signal processing section 700 in response to second control signal 202 provided by control section 200, and reproduces to provide a decoded CDG signal 1001, which corresponds to the CDG data recorded on third data area 123 included in VCD 100. CDG decoding section 1000 changes into either the operative or inoperative state according to whether or not the graphics data exists, and operates to reproduce the language (e.g., Korean, English and Japanese) constituting the respective caption data in accordance with the set state (in fact, a user only selects one kind of language) of the channels 0 and 1.

A superimposing processing section 1100 superimposes decoded CDG signal 1001, which corresponds to the caption data supplied from CDG decoding section 1000, onto first decoded video signal 901, which corresponds to the reproduced video signal supplied from MPEG video/audio decoding section 900, and provides a superimposing-processed video signal 1101 in which the caption data is superimposed on the video signal.

A display control section 1200 inputs superimposing-processed video signal 1101 supplied from superimposing processing section 1100, and provides a display control signal 1201.

A display section 1300 inputs display control signal 1201 supplied from display control section 1200, and displays the picture signal, in which the caption data is superimposed onto the video signal.

Figure 4:
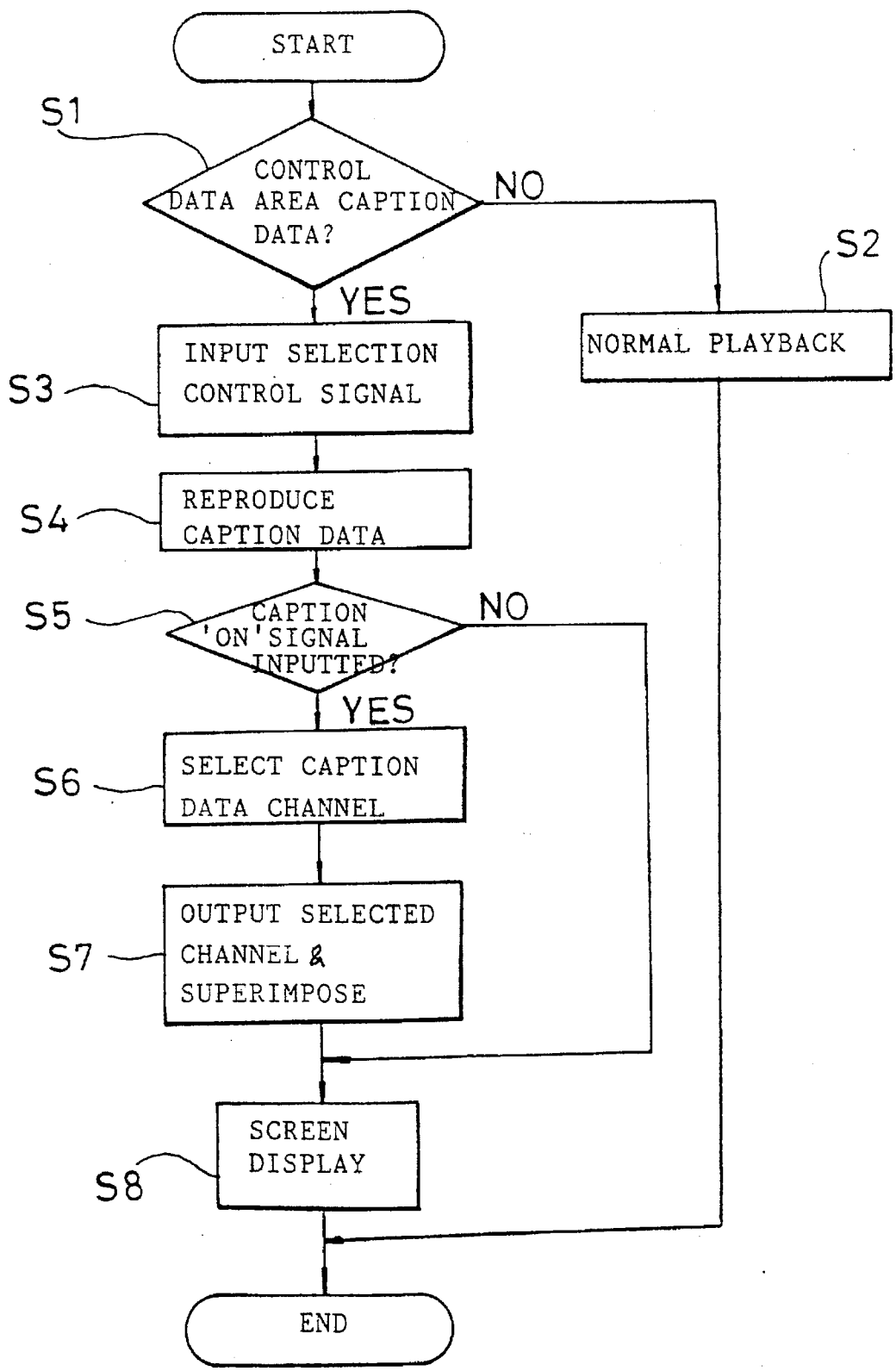
FIG. 4 is a flowchart for showing a reproducing method for the VCD having caption data recorded thereon by using the reproducing apparatus shown in FIG. 3.

A description of the operation of the VCD reproducing apparatus which has the caption data thereon and the aforementioned circuit configuration, will be provided as follows. FIG. 4 is a flowchart for showing a reproducing method for the VCD having caption data recorded thereon by using the reproducing apparatus shown in FIG. 3. As shown in FIG. 4, when the MPEG video/audio signal recorded on user data area 121D (refer to FIG. 1) of VCD 100, which doesn't include the graphics data, is reproduced, servo circuit section 400 performs, under the control operation of control section 200, the servo control operation of spindle motor 300, and the focusing or tracking servo control operation of an objective lens (not shown) included in audio/video readout section 500, which corresponds to the optical pickup apparatus. By this operation, while spindle motor 300 rotationally drives VCD 100 at a predetermined speed, audio/video readout means 500 reads out the RF information from VCD 100, and provides audio/video readout signal 501. Audio/video readout signal 501 is amplified by RF amplifying section 600, and is supplied as amplified RF signal 601. Amplified RF signal 601 is digital-signal-processed, and provided as first and second digital-processed CD signals 701 and 702. First digital-processed CD signal 701 is inputted into CD-ROM decoding section 800, and passes through the CD-ROM decoding process so that the MPEG video/audio signal which is compression-processed by the MPEG algorithm may be reproduced from first digital-processed CD signal 701, and thereby can be supplied as decoded CD-ROM signal 801. Decoded CD-ROM signal 801 corresponds to the decoded MPEG video/audio signal, and is inputted into MPEG video/audio decoding section 900 to be restore-processed in accordance with the MPEG algorithm, which is applied during the performance of the recording operation. Accordingly, an audio signal component of decoded CD-ROM signal is provided as second decoded audio signal 902 corresponding to the analog signal, and is outputted via an audio output apparatus (not shown). In the meantime, first decoded video signal 901 is displayed as the full motion picture on the screen of display section 1300 by the control operation of display control section 1200 via superimposing processing section 1100.

As shown in FIG. 4, when the graphics data exists on VCD 100, control section 200 judges in step S1 whether or not the caption data is included in control data area 123. If the caption data is not included in control data area 123, control section 200 executes in step 2 the above-described normal playback operation of the full motion picture video signal and audio signal. If the caption data is included in control data area 123, control section 200 inputs in step S3 a selection control signal for selecting a kind of caption data (i.e., a kind of language). In step S4, control section 200 performs the playback operation of the caption data. In step S5, control section 200 judges whether or not the control signal (i.e., caption 'on' signal) for the screen display is inputted.

If the control signal for the screen display is inputted, control section 200 selects in step S6 the channel of the desired caption data. In step S7, control section 200 superimposes the caption data of the selected channel onto the reproduced video signal.

If there is an input for selecting a kind of caption data, control section 200 performs the operation for selecting to reproduce the caption data corresponding to a kind of caption data selected. At this time, control section 200 provides the selection control signal for selecting the caption data to CDG decoding section 1000, and first digital-processed CD signal 701 (i.e., the MPEG video/audio signal reproduced from user data area 121D of VCD 100) and second digital-processed CD signal 702 (i.e., CDG caption data) from CD digital signal processing section 700 are respectively decoded in CD-ROM decoding section 800 and CDG decoding section 1000. Decoded CD-ROM signal 801 (i.e., decoded MPEG video/audio signal) from CD-ROM decoding section 800 is restore-processed in MPEG video/audio decoding section 900, and is provided to superimposing processing section 1100. On the other hand, the graphics data inputted into CDG decoding section 1000 is temporally stored in an internal RAM or in a separate memory device of CDG decoding section 1000 in the unit of a channel, and is provided to superimposing processing section 1100 in accordance with the R.G.B signals of the channel designated by control section 200. Consequently, while superimposing processing section 1100 provides first decoded video signal 901 (i.e., full motion picture video signal) supplied from MPEG video/audio decoding section 900, superimposing processing section 1100 mixes R.G.B signals which are outputted to the column and the row positions designated by CDG decoding section 1000, and supplies the superimposing-processed video signal to display control section 1200. In step S8, the full motion picture video signal including the caption data supplied from display control section 1200 is displayed on the screen of display section 1300.

If it is judged in step S5, that the control signal for the screen display of the caption data is not inputted, control section 200 displays only the full motion picture video signal on the screen of display section 1300.

In the VCD having caption data recorded thereon and the reproducing method and an apparatus thereof according to the present invention, a plurality of the CDG caption data prepared in different languages with respect to the same picture signal in the pack units, is recorded on control data area 123 included in VCD 100 in order to enable the channel selection. Also, during the playback operation, the CDG caption data is reproduced when the system is either on or off by the control operation of control section 200. Namely, when the kind of language is selected during the 'on' playback operation of the CDG caption data, the font data corresponding to the selected language is superimposed onto the full motion picture video signal, and is displayed on the screen.

Therefore, first, the character information expressed by the language selected among diverse languages by the user (e.g., Korean, English and Japanese) is displayed while reproducing either the video-song information or the movie program, including a full motion picture. Secondly, high functionality and high quality of a video-song program or a movie program is realized by the various character information with respect to the full motion picture. Thirdly, the user's satisfaction is significantly enhanced by the optimum application of the caption data.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A video compact disc having caption data recorded thereon and including both a lead-in area having disc management information recorded thereon and a lead-out area for indicating a final section of a program area, said video compact disc comprising:

a program area having full motion picture video/audio information recorded thereon, and including a data area having a synchronizing signal, header data and MPEG-processed audio/video data respectively recorded thereon, a error correction code data area having error correction code data recorded thereon, and a control data area having compact disc graphics data recorded thereon, said control data area including a subcode channel having a plurality of caption data recorded thereon prepared in different languages with respect to an identical picture signal, the plurality of caption data constituted in the unit of a pack read out by selecting one of the channels constituting said control data area, a plurality of said packs established in order to designate one of the languages by combining channels 0 and 1 in a data record field, said data record field having font data recorded therein a screen display position of which is designated by a column and a row.

2. A method for reproducing a video compact disc having caption data recorded thereon, said method comprising the steps of:

(i) judging whether or not said caption data is included in a control data area of a program area in said video compact disc when graphics data exists in said video compact disc;

(ii) performing a normal playback processing operation of full motion picture video and audio signals when it is determined in step (i) that said caption data is not included in said video compact disc;

(iii) inputting a selection control signal for selecting a kind of said caption data when it is determined in step (i) that said caption data is included in said video compact disc;

(iv) performing a playback processing operation of said caption data;

(v) judging whether or not a caption on signal for a screen display of said caption data is received;

(vi) displaying the full motion picture video signal on a screen of a display section when it is determined in step (v) that the caption on signal for the screen display of said caption data is not received;

(vii) performing an input operation for designating said caption data of a desired channel when it is determined in step (v) that the control signal for the screen display of said caption data is received;

(viii) mixing a reproduced video signal with said caption data of the channel selected in step (vii), and superimposing said caption data onto the full motion picture video signal; and (ix) displaying the full motion picture video signal including said caption data constituted in step (viii) on the screen of said display section, and wherein said control data area including a subcode channel has a plurality of caption data recorded thereon prepared in different languages with respect to an identical picture signal, with the plurality of caption data constituted in the unit of a pack read out by selecting one of the channels constituting said control data area, with a plurality of said packs established in order to designate one of the languages by combining channels 0 and 1 in a data record field, and with said data record field having font data recorded therein a screen display position of which is designated by a column and a row.

3. An apparatus for reproducing a video compact disc having caption data recorded thereon, said apparatus comprising:

a control section for controlling a caption function set by a control panel section or controlling a normal playback process of said video compact disc when inputting a control signal with respect to the caption function set from said control panel section, inputting a channel selection signal for selecting a language to be displayed on a screen by the caption function, and inputting a control signal for driving the caption function when the system is on or off, and for providing a first and second control signals;

a servo circuit section for providing a first, second and third servo circuit signals in order to rotatably drive said video compact disc, and to search and control a target position for reproducing information from said video compact disc in response to the first control signal from said control section;

audio/video readout means for providing an audio/video readout signal by means of a laser beam to read out audio and video signals from said video compact disc which includes a lead-in area having disc management information recorded thereon, a program area having full motion picture video/audio information recorded thereon, said program area including a first area having a synchronizing signal, header data and MPEG-processed audio/video data respectively recorded thereon, a second data having error correction code data recorded thereon, and a third area having compact disc graphics data recorded thereon and having caption data prepared in different languages with respect to an identical picture data recorded on a subcode channel thereof and a lead-out area for indicating the final section of said program area;

an RF amplifying section for amplifying the audio/video readout signal supplied from said audio/video readout means, and for providing an amplified RF signal;

a CD digital signal processing section for digital-signal-processing the amplified RF signal supplied from said RF amplifying section, and for providing a first and second digital-processed CD signals;

a CD-ROM decoding section for extracting CD-ROM XA data from the first digital-processed CD signal in order to reproduce an MPEG audio/video signal which is processed by means of the MPEG algorithm from the first digital-processed CD signal supplied from said CD digital signal processing section, and for providing a decoded CD ROM signal;

an MPEG audio/video decoding section for restore-processing the decoded CD-ROM signal supplied from said CD-ROM decoding section, and for providing first decoded video signal and a second decoded audio signal respectively corresponding to the MPEG video and audio signals;

a compact disc graphics decoding section for decoding the second digital-processed CD signal supplied from said CD digital signal processing section in response to the second control signal supplied from said control section, and for reproducing to output a decoded compact disc graphics signal corresponding to the CDG data recorded on said third area of said video compact disc;

a superimposing processing section for superimposing the decoded compact disc graphics signal, which corresponds to the caption data supplied from said compact disc graphics decoding section, onto the first decoded video signal corresponding to the reproduced video signal supplied from said MPEG audio/video decoding section, and for providing a superimposing-processed video signal in which the caption data is superimposed onto the video signal;

a display control section for inputting the superimposing-processed video signal supplied from said superimposing processing section, and for providing a display control signal; and a display section for inputting the display control signal supplied from said display control section and for displaying the picture signal in which the caption data is superimposed on the video signal.

4. The apparatus for reproducing a video compact disc having caption data recorded thereon as claimed in claim 3, wherein said first, second and third servo circuit signals are respectively a spindle motor control driving signal, a focusing control operation driving signal, and a tracking control operation driving signal.

5. The apparatus for reproducing a video compact disc having caption data recorded thereon as claimed in claim 3, wherein said caption data is recorded as the compact disc graphics data constituting said third area included in said video compact disc, and is recorded in the unit of a pack in order to make a selective playback operation possible by setting a channel in response to the first decoded video signal supplied from said MPEG video/audio decoding section.

6. The apparatus for reproducing a video compact disc having caption data recorded thereon as claimed in claim 3, wherein said first, second and third areas are respectively a data area, an error correction code data area and a control data area.

7. The apparatus for reproducing a video compact disc having caption data recorded thereon as claimed in claim 3, wherein said control section designates channels for said plurality of caption data prepared in different languages to permit said caption data to be smoothly outputted while the decoded compact disc graphics signal is outputted from said compact disc graphics decoding section in response to the second control signal supplied from said control section.

* * * * *